United States Patent
Chang et al.

(10) Patent No.: US 12,427,978 B2
(45) Date of Patent: Sep. 30, 2025

(54) MINIMUM RISK DECISION SYSTEM AND METHOD FOR LANE-CHANGING AND NON-TRANSITORY COMPUTER READABLE MEDIA

(71) Applicant: Automotive Research & Testing Center, Changhua County (TW)

(72) Inventors: Hao-Che Chang, Changhua County (TW); Tsung-Ming Hsu, Changhua County (TW); Shou-Ti Cheng, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 203 days.

(21) Appl. No.: 18/522,264

(22) Filed: Nov. 29, 2023

(65) Prior Publication Data
US 2025/0171015 A1    May 29, 2025

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
CPC .. B60W 30/09; B60W 30/0956; B60W 30/16; B60W 30/18163; B60W 40/105;
(Continued)

(56) References Cited

U.S. PATENT DOCUMENTS

| 6,820,007 B2 * | 11/2004 | Abe | B60T 7/22 340/436 |
| 7,925,441 B2 * | 4/2011 | Maemura | B60T 7/22 348/148 |

(Continued)

FOREIGN PATENT DOCUMENTS

| CN | 112572465 A | 3/2021 |
| CN | 109582019 B | 6/2021 |

(Continued)

*Primary Examiner* — Andrew Joseph Rudy
(74) *Attorney, Agent, or Firm* — CKC & Partners Co., LLC (57) ABSTRACT

A minimum risk decision system for lane-changing includes at least one processor. The processor includes an external risk region calculating module, a system failure judging module, a self-driving starting condition confirming module, and a decision module. The external risk region calculating module calculates an external risk region. The system failure judging module judges whether a system fails. The self-driving starting condition confirming module confirms whether a self-driving starting condition is satisfied. The decision module includes a judging unit, a horizontal vector calculating unit, a drivable space calculating unit, and a decision executing unit. The judging unit judges whether the host vehicle encounters any one of an external risk, a system failure risk and a self-driving starting condition unsatisfied risk. The decision executing unit executes a minimum risk decision as encountering any one of the external risk, the system failure risk and the self-driving starting condition unsatisfied risk.

19 Claims, 7 Drawing Sheets

(51) Int. Cl.
*B60W 30/16* (2020.01)
*B60W 30/18* (2012.01)
*B60W 40/105* (2012.01)
*B60W 40/109* (2012.01)
*B60W 50/02* (2012.01)
*B60W 50/14* (2020.01)
*B60W 60/00* (2020.01)

(52) U.S. Cl.
CPC .... *B60W 30/18163* (2013.01); *B60W 40/105* (2013.01); *B60W 40/109* (2013.01); *B60W 50/0205* (2013.01); *B60W 50/14* (2013.01); *B60W 60/0059* (2020.02); *B60W 2554/802* (2020.02)

(58) Field of Classification Search
CPC . B60W 40/109; B60W 50/0205; B60W 50/14
USPC ......................................................... 701/301
See application file for complete search history.

(56) References Cited

U.S. PATENT DOCUMENTS

| | | | | |
|---|---|---|---|---|
| 12,179,754 | B2* | 12/2024 | Okura | B60W 30/0956 |
| 12,195,002 | B2* | 1/2025 | Lin | B60W 30/0953 |
| 12,214,788 | B2* | 2/2025 | Park | B60W 50/0098 |
| 2025/0042407 | A1* | 2/2025 | Abad | B60W 60/0015 |
| 2025/0083666 | A1* | 3/2025 | Do | B60W 50/0098 |

FOREIGN PATENT DOCUMENTS

| | | |
|---|---|---|
| CN | 114291115 A | 4/2022 |
| CN | 114620071 A | 6/2022 |
| CN | 111824173 B | 12/2022 |

\* cited by examiner

MINIMUM RISK DECISION SYSTEM AND METHOD FOR LANE-CHANGING AND NON-TRANSITORY COMPUTER READABLE MEDIA

BACKGROUND

Technical Field

The present disclosure relates to a minimum decision system and a method and a non-transitory computer readable media. More particularly, the present disclosure relates to a minimum decision system and a method for lane-changing and a non-transitory computer readable media.

Description of Related Art

Recently, autonomous vehicles are quickly developed, and SAE international and NHTSA define five levels of driving automation based on the drive assistance and automation level design. Level 3 autonomous vehicles include a self-driving system that is capable of identifying the environment but the driver can appropriately intervene the driving.

In order to increase the safety of self-driving, UN R157 is published by the World Forum for Harmonization of Vehicle Regulations as a rule of Level 3 autonomous vehicles. The goal is to have a driver right transition and a minimum protecting mechanism as the self-driving vehicle encounters an emergency, e.g., the system failure, or as the self-driving starting requirement is not satisfied. Since the conventional technique lacks a minimum risk decision of lane-changing, how to allow the lane-changing of the self-driving to satisfy the requirements of UN R157 becomes a target those in the industry pursue.

SUMMARY

According to one aspect of the present disclosure, a minimum risk decision system for lane-changing, which is disposed at a host vehicle, includes at least one processor. The at least one processor includes an external risk region calculating module, a system failure judging module, a self-driving starting condition confirming module, and a decision module. The external risk region calculating module is configured to calculate a collision time between the host vehicle in a present position and a front article at one of a plurality of time points after the host vehicle performs a lane-changing decision, to calculate a horizontal acceleration of the host vehicle in the present position changing to a target lane based on the collision time, and to calculate an external risk region based on a horizontal distance of the host vehicle changing to the target lane and a larger one of the horizontal acceleration and a maximum regular horizontal acceleration. The system failure judging module is configured to judge whether a system of the host vehicle at any one of the time points fails and to judge whether a horizontal module of a backup system of the host vehicle is normal. The self-driving starting condition confirming module is configured to confirm whether a self-driving starting condition is satisfied based on whether a condition of a driver of the host vehicle is usable at any one of the time points. The decision module includes a judging unit, a horizontal vector calculating unit, a drivable space calculating unit, and a decision executing unit. The judging unit is configured to judge whether the host vehicle encounters any one of an external risk, a system failure risk and a self-driving starting condition unsatisfied risk. In a status that the system is normal, if a longitudinal relative distance between the host vehicle and the front article at one of the time points is smaller than or equal to the external risk region, encountering the external risk is confirmed. If the system fails while the horizontal module of the backup system is normal at one of the time points, encountering the system failure risk is confirmed. If the system is normal and the longitudinal relative distance is larger than the external risk region at one of the time points, but the self-driving starting condition is not satisfied, encountering the self-driving starting condition unsatisfied risk is confirmed. The horizontal vector calculating unit is configured to calculate a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and to calculate a horizontal vector of the host vehicle based on the emergency horizontal acceleration or a regular horizontal acceleration. The drivable space calculating unit is configured to calculate a drivable space on the target lane at the one of the time points based on the horizontal distance, the horizontal vector and a rear article speed of a rear article on the target lane as encountering any one of the external risk, the system failure risk and the self-driving starting condition unsatisfied risk. The decision executing unit executes a minimum risk decision as encountering any one of the external risk, the system failure risk and the self-driving starting condition unsatisfied risk. As encountering the external risk or the system failure risk, the host vehicle drives into the drivable space at the horizontal vector or decelerates to zero. As encountering the self-driving starting condition unsatisfied risk, the host vehicle drives into the drivable space at the horizontal vector, or the host vehicle moves along an original track according to the lane-changing decision at least for a period to another one of the time points. If the self-driving starting condition keeps being unsatisfied, the target lane at the another one of the time points, the horizontal vector for lane-changing and the drivable space are reconfirmed.

According to another aspect of the present disclosure, a minimum risk decision method for lane-changing includes an external risk region calculating step, a system failure judging step, a self-driving starting condition confirming step, a risk judging step, a horizontal vector calculating step, a drivable space calculating step, and a minimum risk decision executing step. In the external risk region calculating step, an external risk region calculating module of at least one processor calculates a collision time between a host vehicle in a present position and a front article at one of a plurality of time points after the host vehicle performs a lane-changing decision, calculates a horizontal acceleration of the host vehicle in the present position changing to a target lane based on the collision time, and calculates an external risk region based on a horizontal distance of the host vehicle changing to the target lane and a larger one of the horizontal acceleration and a maximum regular horizontal acceleration. In the system failure judging step, a system failure judging module of the at least one processor judges whether a system of the host vehicle at any one of the time points fails and judges whether a horizontal module of a backup system of the host vehicle is normal. In the self-driving starting condition confirming step, a self-driving starting condition confirming module of the at least one processor confirms whether a self-driving starting condition is satisfied based on whether a condition of a driver of the host vehicle is usable at any one of the time points. In the risk judging step, a judging unit of the at least one processor judges whether the host vehicle encounters any one of an external risk, a system failure risk and a self-driving starting condition unsatisfied risk. In a status that the system is normal, if a longitudinal relative distance between the host vehicle and the front article at one of the time points is smaller than or equal to the external risk region, encountering the external risk is confirmed; if the system fails while the horizontal module of the backup system is normal at one of the time points, encountering the system failure risk is confirmed; if the system is normal and the longitudinal relative distance is larger than the external risk region at one of the time points, but the self-driving starting condition is not satisfied, encountering the self-driving starting condition unsatisfied risk is confirmed. In the horizontal vector calculating step, a horizontal vector calculating unit of the at least one processor calculates a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and calculates a horizontal vector of the host vehicle based on the emergency horizontal acceleration or a regular horizontal acceleration. In the drivable space calculating step, a drivable space calculating unit of the at least one processor calculates a drivable space on the target lane at the one of the time points based on the horizontal distance, the horizontal vector and a rear article speed of a rear article on the target lane as encountering any one of the external risk, the system failure risk and the self-driving starting condition unsatisfied risk. In the minimum risk decision executing step, a decision executing unit of the at least one processor executes a minimum risk decision as encountering any one of the external risk, the system failure risk and the self-driving starting condition unsatisfied risk. As encountering the external risk or the system failure risk, the host vehicle drives into the drivable space at the horizontal vector or decelerates to zero. As encountering the self-driving starting condition unsatisfied risk, the host vehicle drives into the drivable space at the horizontal vector, or the host vehicle moves along an original track according to the lane-changing decision at least for a period to another one of the time points, if the self-driving starting condition keeps being unsatisfied, the target lane at the another one of the time points, the horizontal vector for lane-changing and the drivable space are reconfirmed.

According to yet another aspect of the present disclosure, a non-transitory computer readable media, which stores a computer program for at least one processor to conduct calculating a collision time between a host vehicle in a present position and a front article at one of a plurality of time points after the host vehicle performs a lane-changing decision, calculating a horizontal acceleration of the host vehicle in the present position changing to a target lane based on the collision time, and calculating an external risk region based on a horizontal distance of the host vehicle changing to the target lane and a larger one of the horizontal acceleration and a maximum regular horizontal acceleration; judging whether a system of the host vehicle at any one of the time points fails and judges whether a horizontal module of a backup system of the host vehicle is normal; confirming whether a self-driving starting condition is satisfied based on whether a condition of a driver of the host vehicle is usable at any one of the time points; judging whether the host vehicle encounters any one of an external risk, a system failure risk and a self-driving starting condition unsatisfied risk, in a status that the system is normal, if a longitudinal relative distance between the host vehicle and the front article at one of the time points is smaller than or equal to the external risk region, encountering the external risk is confirmed; if the system fails while the horizontal module of the backup system is normal at one of the time points, encountering the system failure risk is confirmed; if the system is normal and the longitudinal relative distance is larger than the external risk region at one of the time points, but the self-driving starting condition is not satisfied, encountering the self-driving starting condition unsatisfied risk is confirmed; calculating a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and calculating a horizontal vector of the host vehicle based on the emergency horizontal acceleration or a regular horizontal acceleration; calculating a drivable space on the target lane at the one of the time points based on the horizontal distance, the horizontal vector and a rear article speed of a rear article on the target lane as encountering any one of the external risk, the system failure risk and the self-driving starting condition unsatisfied risk; executing a minimum risk decision as encountering any one of the external risk, the system failure risk and the self-driving starting condition unsatisfied risk, as encountering the external risk or the system failure risk, the host vehicle drives into the drivable space at the horizontal vector or decelerates to zero, and as encountering the self-driving starting condition unsatisfied risk, the host vehicle drives into the drivable space at the horizontal vector, or the host vehicle moves along an original track according to the lane-changing decision at least for a period to another one of the time points, if the self-driving starting condition keeps being unsatisfied, the target lane at the another one of the time points, the horizontal vector for lane-changing and the drivable space are reconfirmed.

BRIEF DESCRIPTION OF THE DRAWINGS

The disclosure can be more fully understood by reading the following detailed description of the embodiments, with reference made to the accompanying drawings as follows.

DETAILED DESCRIPTION

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in the drawings in a simple way; the repeated elements may be labeled by the same or similar reference numerals.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 1:
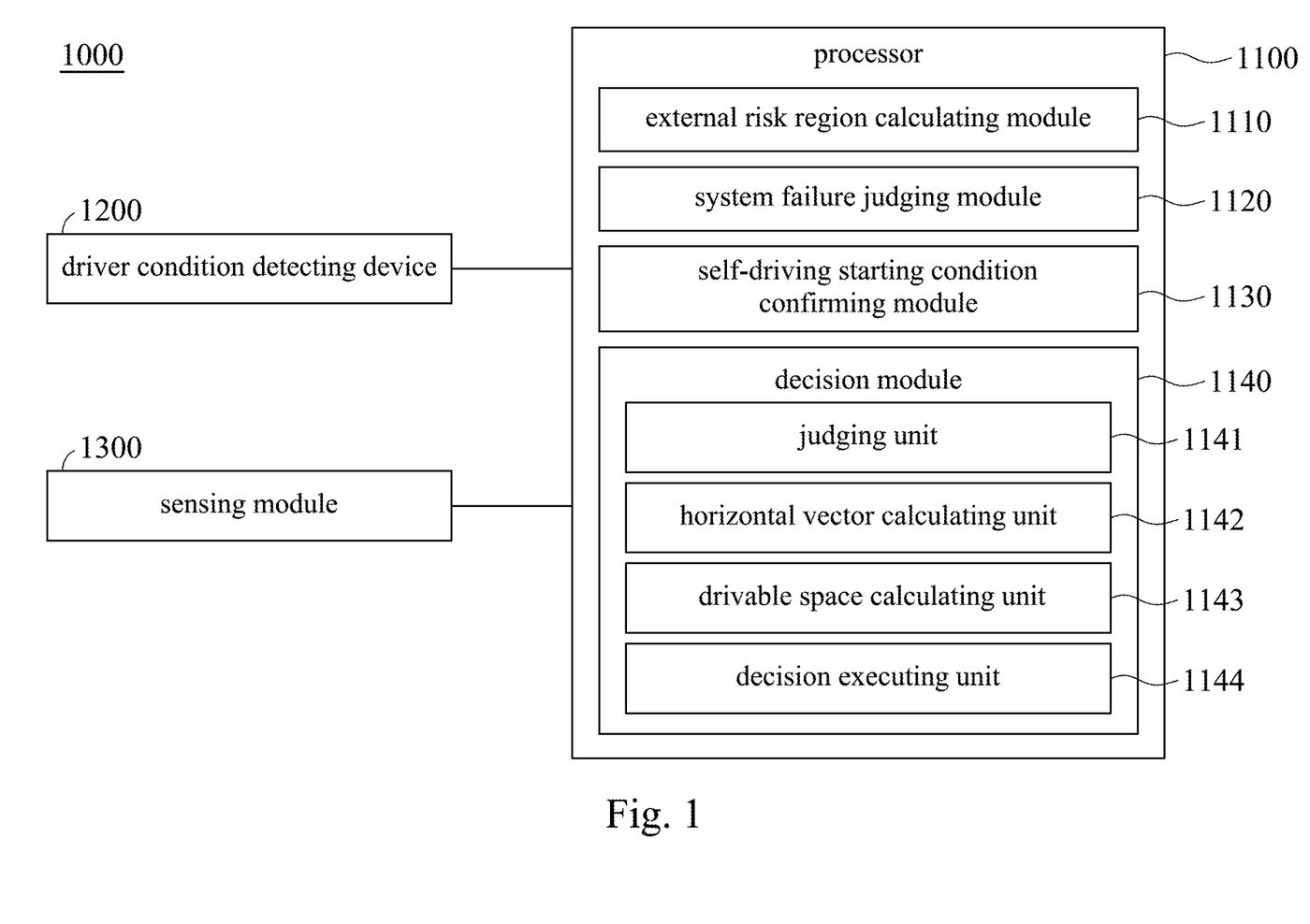
FIG. 1 shows a block diagram of a minimum risk decision system for lane-changing according to one embodiment of the present disclosure.
Figure 2:
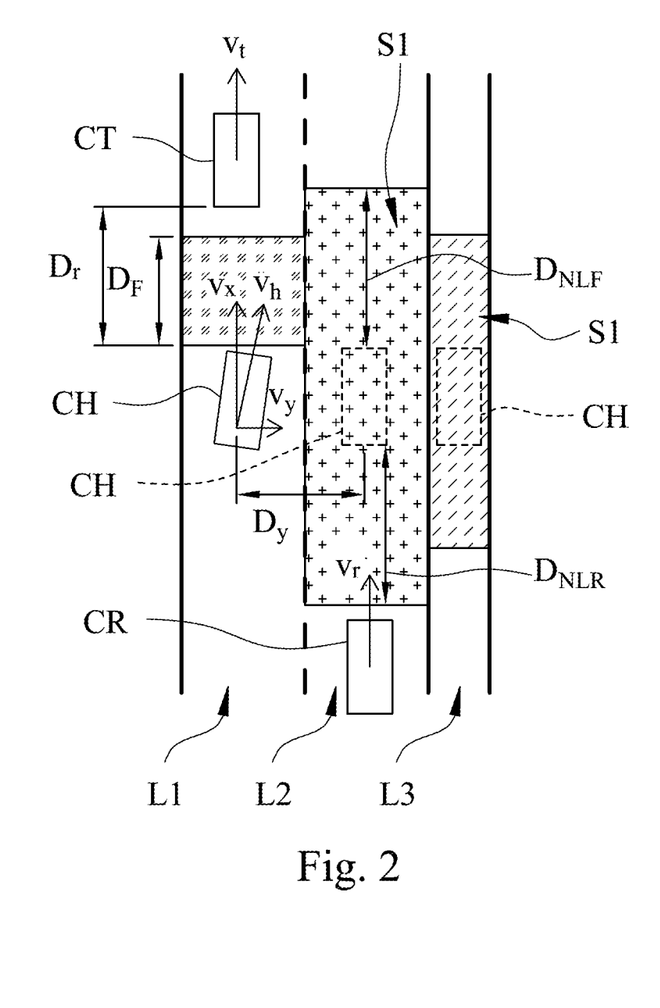
FIG. 2 shows a schematic view of the minimum risk decision system of FIG. 1 installed in a host vehicle and applied on a road.

FIG. 1 shows a block diagram of a minimum risk decision system 1000 for lane-changing according to one embodiment of the present disclosure. FIG. 2 shows a schematic view of the minimum risk decision system 1000 of FIG. 1 installed in a host vehicle CH and applied on a road. The minimum risk decision system 1000 disposed at the host vehicle CH includes at least one processor 1100. The at least one processor 1100 includes an external risk region calculating module 1110, a system failure judging module 1120, a self-driving starting condition confirming module 1130, and a decision module 1140.

The external risk region calculating module 1110 is configured to calculate a collision time between the host vehicle CH in a present position and a front article CT at one of a plurality of time points after the host vehicle CH performs a lane-changing decision, to calculate a horizontal acceleration of the host vehicle CH in the present position changing to a target lane based on the collision time, and to calculate an external risk region $D_F$ based on a horizontal distance $D_y$ of the host vehicle CH changing to the target lane and a larger one of the horizontal acceleration and a maximum regular horizontal acceleration. The system failure judging module 1120 is configured to judge whether a system of the host vehicle CH at any one of the time points fails and to judge whether a horizontal module of a backup system of the host vehicle CH is normal. The self-driving starting condition confirming module 1130 is configured to confirm whether a self-driving starting condition is satisfied based on whether a condition of a driver of the host vehicle CH is usable at any one of the time points.

The decision module 1140 includes a judging unit 1141, a horizontal vector calculating unit 1142, a drivable space calculating unit 1143, and a decision executing unit 1144. The judging unit 1141 is configured to judge whether the host vehicle CH encounters any one of an external risk, a system failure risk and a self-driving starting condition unsatisfied risk. In a status that the system is normal, if a longitudinal relative distance $D_r$ between the host vehicle CH and the front article CT at one of the time points is smaller than or equal to the external risk region $D_F$, that is $D_r \leq D_F$, encountering the external risk is confirmed. If the system fails while the horizontal module of the backup system is normal at one of the time points, encountering the system failure risk is confirmed. If the system is normal and the longitudinal relative distance $D_r$ is larger than the external risk region $D_F$ at one of the time points, that is $D_r > D_F$, but the self-driving starting condition is not satisfied, encountering the self-driving starting condition unsatisfied risk is confirmed.

The horizontal vector calculating unit 1142 is configured to calculate a lane-changing time of the host vehicle CH changing to the target lane at the one of the time points as encountering any one of the external risk, the system failure risk and the self-driving starting condition unsatisfied risk so as to calculate an emergency horizontal acceleration of the host vehicle CH, and to calculate a horizontal vector $v_y$ of the host vehicle based on the emergency horizontal acceleration or a regular horizontal acceleration.

The drivable space calculating unit 1143 is configured to calculate a drivable space S1 on the target lane at the one of the time points based on the horizontal distance $D_y$, the horizontal vector $v_y$, and a rear article speed $v_r$ of a rear article CR on the target lane as encountering any one of the external risk, the system failure risk and the self-driving starting condition unsatisfied risk.

The decision executing unit 1144 executes a minimum risk decision as encountering any one of the external risk, the system failure risk and the self-driving starting condition unsatisfied risk. As encountering the external risk or the system failure risk, the host vehicle CH drives into the drivable space S1 at the horizontal vector $v_y$ or decelerates to zero. As encountering the self-driving starting condition unsatisfied risk, the host vehicle CH drives into the drivable space S1 at the horizontal vector $v_y$, or the host vehicle CH moves along an original track according to the lane-changing decision at least for a period to another one of the time points. If the self-driving starting condition keeps being unsatisfied, the target lane at the another one of the time points, the horizontal vector $v_y$ for lane-changing and the drivable space S1 are reconfirmed.

Therefore, with calculating the external risk region $D_F$ and detecting whether the system is failure and whether the self-driving starting condition is satisfied, encountering the external risk, the system failure risk or the self-driving starting condition or not may be confirmed. The drivable space S1 may be calculated for conducting the minimum risk decision to allow the lane-changing to satisfy the requirements of UN R157, thereby increasing the safety. The details of the minimum risk decision system 1000 may be described hereinafter.

The at least one processor 1100 of the minimum risk decision system 1000 may be installed on the host vehicle CH. Precisely, a number of the at least one processor 1100 may be two, one of the processors 1100 includes the controlling programs of the system (main system), and the other one of the processors 1100 includes the controlling programs of the backup system. The processor 1100 may for example be a central processing unit (CPU), a digital signal processor (DSP), a microprocessor unit (MPU) or a microcontroller unit (MCU). The processor 1100 is programmable for achieving specific functions. In the present disclosure, each processor 1100 is programmable to include the external risk region calculating module 1110, the system failure judging module 1120, the self-driving starting condition confirming module 1130, and the decision module 1140, and different parts of the program of the decision module 1140 may be divided into the judging unit 1141, the horizontal vector calculating unit 1142, the drivable space calculating unit 1143, and the decision executing unit 1144. In addition to the aforementioned functions, the processor 1100 may be programmable for achieving a general control of the host vehicle CH and image processing, and the present disclosure is not limited thereto. In one embodiment, the main system may include a plurality of mechanisms of the vehicle, e.g., the braking mechanism and the steering mechanism, to be controlled by the programs of the main system for driving. The control programs of the backup system may also control the mechanism. In another embodiment, there are two identical mechanisms respectively controlled by the main system and the backup system.

The minimum risk decision system 1000 may further include a driver condition detecting device 1200 and a sensing module 1300. The sensing module 1300 may include a plurality of cameras for detecting an external environment of the host vehicle CH. Consequently, the present environment may be shot by the cameras, and the longitudinal relative distance $D_r$ between the host vehicle CH and the front article CT, the front article speed $v_t$ of the front article CT, the present position of the host vehicle CH on the lane L1 and the lane markings may be obtained by the processor 1100. The sensing module 1300 may also include radars for detecting the obstacle near the host vehicle CH, but the present disclosure is not limited thereto. The driver condition detecting device 1200 may detect the eyes and the posture of the driver, and the state of the seatbelt, and the results may be provided to the self-driving starting condition confirming module 1130 to confirm whether the self-driving starting condition is satisfied. In the embodiment, the self-driving starting condition may be the regulations in the partially automated lane change systems (PALS) in ISO21202, UNR79 or 47-2 of Taiwan VACC.

The external risk region calculating module 1110 may calculate $T_c = D_r/(v_t - v_h)$, $a_y = 2D_y/(T_c^2)$, $a_{ymax} = \max(a_y, a_{yrgmax})$ and $D_F = (2D_y/a_{ymax})^{0.5} \times v_x$, $T_c$ represents the collision time, $D_r$ represents the longitudinal relative distance between the host vehicle CH and the front article CT, $v_h$ represents a host vehicle speed, $v_t$ represents a front article speed, $a_y$ represents the horizontal acceleration calculated based on the collision time, $a_{yrgmax}$ represents the maximum regular horizontal acceleration, $a_{ymax}$ represents the larger one of the horizontal acceleration and the maximum regular horizontal acceleration, $D_y$ represents the horizontal distance, $v_x$ represents a longitudinal vector of the host vehicle speed, and $D_F$ represents the external risk region. It is noted that, in a general status, the to-be-achieve position of the host vehicle is located at a central line of the target lane, and thus the horizontal distance is the distance between the center of the host vehicle and the central line of the target lane.

As shown in FIGS. 1 and 2, as the host vehicle CH is driving by the system, the system may decide whether to change lanes based on situations of the present lane of the host vehicle CH, i.e., the lane L1, and the adjacent lane, i.e., a lane L2. After the lane-changing decision is made, the host vehicle CH starts to change lanes automatically. During the lane-changing process, the external risk region calculating module 1110 continuously detects the host vehicle speed $v_h$, the longitudinal relative distance $D_r$ between the host vehicle CH and the front article CT, and the front article speed $v_t$, and then calculates $T_c = D_r/(v_t - v_h)$ to obtain the collision time, i.e., $T_c$. After which, the collision time may be used to calculate the horizontal acceleration of the host vehicle CH, the horizontal acceleration may then be compared with the maximum regular horizontal acceleration to calculate $a_{ymax} = \max(a_y, a_{yrgmax})$, and thus obtain the larger one of the horizontal acceleration and the maximum regular horizontal acceleration. Subsequently, the time may be transferred to the space, and the external risk region $D_F$ may be obtained by calculating $D_F = (2D_y/a_{ymax})^{0.5} \times v_x$. If any article, including the front article CT, is present in the external risk region $D_F$, collision may occur if the host vehicle CH follows the track including the speed originally designed by the system. Therefore, the track or path may have to be changed to increase the driving safety. Accordingly, the horizontal vector $v_y$ and the drivable space S1 may be calculated to redesign the track.

As encountering the external risk or the system failure risk at one of the time points is confirmed by the judging unit 1141, the horizontal vector calculating unit 1142 may calculate $T_{Lc} = \max[(D_r - L)/(v_t - v_h), T_c/2, t_{ISO\ limit}]$ and $a_y^E = D_y/(T_{Lc}^2)$, $T_{Lc}$ represents the lane-changing time, L represents a length of the host vehicle CH, $t_{ISO\ limit}$ represents a regulation lane-changing prohibition time, and $a_y^E$ represents the emergency horizontal acceleration. After defining the drivable space S1, the host vehicle CH may start to move horizontally to the drivable space S1. Since the host vehicle CH will move longitudinally forward as moving horizontally, the difference between the longitudinal relative distance $D_r$ and a length L of the host vehicle CH, and the relation between the host vehicle speed $v_h$ and the front article speed $v_t$ have to be considered for the lane-changing time. Moreover, that the host vehicle CH have to enter the drivable space S1 in half collision time, and the regulation lane-changing prohibition time of each country also have to be taken into consideration. Therefore, $T_{Lc} = \max[(D_r - L)/(v_t - v_h), T_c/2, t_{ISO\ limit}]$ is used to obtain the largest one thereof to be the lane-change time, and the lane-change time may be used to calculate the emergency horizontal acceleration. After which, the emergency horizontal acceleration may be used to calculate the horizontal vector $v_y$. Since there is a high possibility for the host vehicle CH to collide at this time, quick horizontal movement with high speed is required to prevent collision. Additionally, the horizontal vector calculating unit 1142 may further calculate a steering angle corresponding to the horizontal vector $v_y$.

Furthermore, as encountering the self-driving starting condition unsatisfied risk is confirmed by the judging unit 141 at the one of the time points, the horizontal vector calculating unit 1142 calculates $T_{Lc} = \max[(D_r - L)/(v_t - v_h), T_c/2, t_{ISO\ limit}]$, but the regular horizontal acceleration is used to calculate the horizontal vector $v_y$. In the situation, because only the driver is disable but the system is normal and no external risk is present, the host vehicle CH may change lanes at the regular horizontal acceleration.

When the drivable space calculating unit 1143 defines the drivable space S1, the rear article speed $v_r$ of the rear article CR will be taken into consideration for calculating a longitudinal front extendable distance $D_{NLF}$ extending from the host vehicle CH, especially from the front thereof, and a longitudinal rear extendable distance $D_{NLR}$ extending from the host vehicle CH, especially from the back thereof, for the drivable space S1. Consequently, $D_{NLF} = (D_y/v_y)$ and $D_{NLR} = (D_y/v_y) \times \max(v_x, v_r)$ may be calculated respectively to obtain the longitudinal front extendable distance $D_{NLF}$ and the longitudinal rear extendable distance $D_{NLR}$ based on the length, the horizontal vector $v_y$ and the longitudinal vector $v_x$ of the host vehicle CH, the rear article speed $v_r$, and the horizontal distance $D_y$ between the host vehicle CH and the target lane. In one embodiment, as the drivable space is located at the lane or the lane shoulder, a width of the drivable space may be equal to the width of the lane or the lane shoulder. In a case without the lane shoulder, an outer boundary of the drivable space, which is away from the host vehicle, is equal to a road edge, and a width of the drivable space is equal to the width of the host vehicle or equal to 3.5 m. The central line of the target lane is equal to half a width of the host vehicle extending inward from the road edge, or is equal to 1.75 m extending inward from the road edge, and the present disclosure is not limited thereto. In the present disclosure, the target lane may indicate the lane nearby, or a space nearby where a vehicle may drive, and will not be limited to a lane having lane markings.

As shown in FIG. 2, in a suppose situation, the host vehicle CH starts to change from the lane L1 to the lane L2. When the front article CT is suddenly decelerating or braking at one of the time points while the present position of the host vehicle CH is still on the lane L1 and the longitudinal relative distance $D_r$ at the one of the time points is smaller than or equal to the external risk region $D_F$, encountering the external risk is judged by the judging unit 1141, and then the emergency horizontal acceleration at the present time point may be calculated to calculate the horizontal vector $v_y$, and the drivable space S1 on the lane L2 near the lane L1. If the decision executing unit 1144 judges that no obstacle is present in the drivable space S1 on the lane L2, and the emergency horizontal acceleration is smaller than or equal to the regulation emergency acceleration upper limitation, the steering mechanism may be informed to allow the host vehicle CH to change into the drivable space S1 on the lane L2. Otherwise, the brake mechanism is informed to allow the host vehicle CH to decelerate to zero. To be more specific, as the emergency horizontal acceleration is smaller than or equal to the regulation emergency acceleration upper limitation, e.g., 4 meters per second squared, the emergency horizontal acceleration is safe and complies the law, and therefore the host vehicle CH may drive into the drivable space S1 on the lane L2 with the steering angle and at the horizontal vector $v_y$, calculated based on the emergency horizontal acceleration. If the emergency horizontal acceleration is larger than the regulation emergency acceleration upper limitation, the emergency horizontal acceleration is not safe, and the host vehicle CH will not change lanes but decelerate to zero. Moreover, if an obstacle is present in the drivable space S1 on the lane L2, collision may generate as driving into the drivable space S1, and the host vehicle CH will not change lanes but decelerate to zero. It is noted that, because the horizontal control of the system is normal, the body of the host vehicle CH will be turned back before decelerate, and then decelerate at 4 meters per second squared to zero owing to the possible collision.

Furthermore, the host vehicle CH may gradually drive to a right side until driving into the drivable space S1 located at a lane shoulder L3 and decelerates to zero. Specifically, as the host vehicle CH changes from the lane L1 to the lane L2, that is being in the drivable space S1 on the lane L2, the host vehicle CH may keep moving to the right side to the lane shoulder L3, that is, the target lane at the present time point being the lane shoulder L3. The drivable space S1 on the lane shoulder L3 and the emergency horizontal acceleration may then be recalculated, and the host vehicle CH will change from the lane L2 to the lane shoulder L3. As shown in FIG. 2, the host vehicle CH may decelerate to zero after driving into the drivable space S1 on the lane shoulder L3. Since the lane shoulder L3 is relative safer, the deceleration may be smaller than 4 meters per second squared and may be in a range of 1 meter per second squared to 3 meters per second squared.

In another suppose case, the host vehicle CH starts to change from the lane L1 to the lane L2. If the system fails but the horizontal module of the backup system is normal, encountering the system failure risk is judged by the judging unit 1141, and then the emergency horizontal acceleration at the present time point may be calculated to calculate the horizontal vector $v_y$, and the drivable space S1 on the lane L2 near the lane L1. If the decision executing unit 1144 judges that no obstacle is present in the drivable space S1 on the lane L2, and the emergency horizontal acceleration is smaller than or equal to the regulation emergency acceleration upper limitation, the host vehicle CH changes into the drivable space S1 on the lane L2. Otherwise, the host vehicle CH decelerates to zero. It is noted that the minimum risk decision executed as encountering the system failure risk is similar to the minimum risk decision executed as encountering the external risk, but the processor 1100 including the control programs of the backup system may be used to conduct relative calculation as encountering the system failure risk.

In yet another suppose case, the host vehicle CH changes from the lane L1 to the lane L2, and the driver goes into a deep coma for some reason at a time point. The driver condition detecting device 1200 detects the eyes of the driver and sends driver abnormal information to the self-driving starting condition confirming module 1130, and the self-driving starting condition confirming module 1130 confirms that the self-driving starting condition is not satisfied. If the system is normal and the host vehicle CH does not encounter the external risk, the judging unit 1141 judges that the host vehicle CH encounters the self-driving starting condition unsatisfied risk. In one minimum risk decision, the drivable space S1 on the lane L2 at the present time point may be calculated, and if no obstacle is present in the drivable space S1, the host vehicle CH may change into the drivable space S1 at the horizontal vector $v_y$, obtained by the regular horizontal acceleration. On the contrary, as an obstacle is present in the drivable space S1 on the lane L2 at the present time point, the host vehicle CH may change into the drivable space S1 at the horizontal vector $v_y$, obtained by the regular horizontal acceleration after the obstacle leaves. It is noted that, since the system is normal at the present time point, the host vehicle CH may turn back to wait for the obstacle to leave, and then change into the drivable space S1 on the lane L2. Moreover, after the host vehicle CH drives into the drivable space S1 on the lane L2, the host vehicle CH may calculate the drivable space S1 on the lane shoulder L3, and changes lanes at the horizontal vector $v_y$, obtained by the regular horizontal acceleration. In other words, the host vehicle CH may gradually drive to a right side until driving into the drivable space located at a lane shoulder and then decelerates to zero.

In another minimum risk decision, as the judging unit 1141 judges that host vehicle CH encounters the self-driving starting condition unsatisfied risk, the host vehicle CH moves along an original track according to the lane-changing decision at least for a period to another one of the time points to reconfirm whether the self-driving starting condition keeps being unsatisfied. Precisely, the original track indicates the steering angle, the speed and the acceleration of the host vehicle CH as changing from the lane L1 to the lane L2 decided by the lane-changing decision. Because the system is normal and no external risk is present, the decision executing unit 1144 may provide a warning during the aforementioned period, e.g., 10 seconds. The host vehicle CH may finish the movement of the original track during 10 seconds and changes from the lane L1 to the lane L2. If the self-driving starting condition keeps being unsatisfied, the driver may have no reaction capability, and the host vehicle CH is better to stop at the road side to prevent dangerous. Hence, the present position of the host vehicle CH at the aforementioned another one of the time points may be on the lane L2, and the target lane may be the lane shoulder L3. The drivable space S1 on the lane shoulder L3 may be calculated, then the host vehicle CH may change into the drivable space L3 and decelerates to zero, and a deceleration may be smaller than 3 meters per second squared. It is noted that, although the embodiment of FIG. 2 is illustrated as the lane L1, the lane L2 and the lane shoulder L3, the host vehicle may gradually drive to a right side until driving into a drivable space located at a lane shoulder or beside a road side in one embodiment having many lanes.

Figure 3:
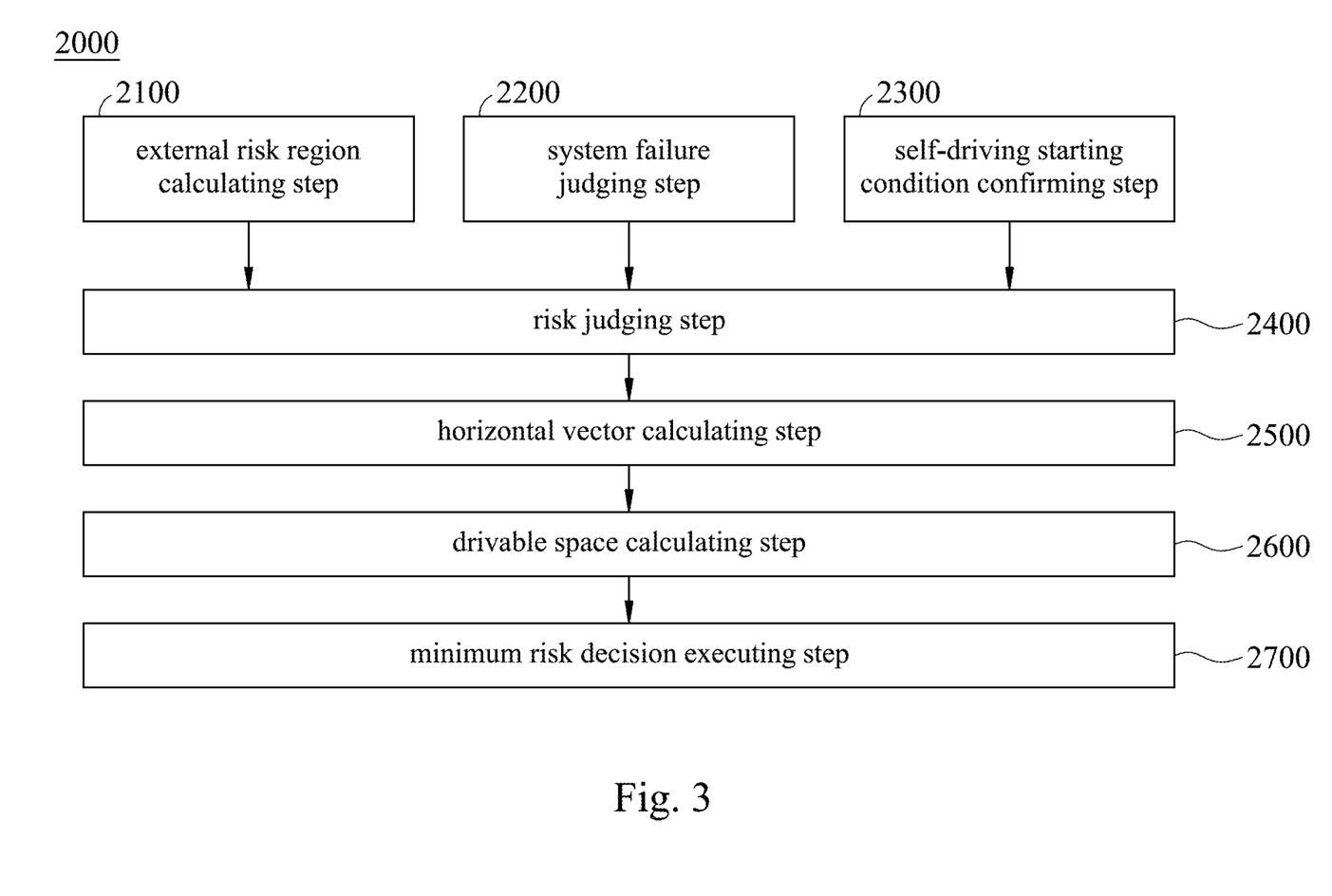
FIG. 3 shows a block flow chart of a minimum risk decision method for lane-changing according to another embodiment of the present disclosure.

FIG. 3 shows a block flow chart of a minimum risk decision method 2000 for lane-changing according to another embodiment of the present disclosure. The minimum risk decision method 2000 for lane-changing includes an external risk region calculating step 2100, a system failure judging step 2200, a self-driving starting condition confirming step 2300, a risk judging step 2400, a horizontal vector calculating step 2500, a drivable space calculating step 2600, and a minimum risk decision executing step 2700. The minimum risk decision method 2000 may be described with the minimum risk decision system 1000 of FIGS. 1 and 2.

In the external risk region calculating step 2100, the external risk region calculating module 1110 of the at least one processor 1100 calculates the collision time between the host vehicle CH in the present position and the front article CT at one of the plurality of time points after the host vehicle CH performs the lane-changing decision, calculates the horizontal acceleration of the host vehicle CH in the present position changing to the target lane based on the collision time, and calculates the external risk region $D_F$ based on the horizontal distance $D_y$ of the host vehicle CH changing to the target lane and the larger one of the horizontal acceleration and a maximum regular horizontal acceleration.

In the system failure judging step 2200, the system failure judging module 1120 of the at least one processor 1100 judges whether the system of the host vehicle CH at any one of the time points fails and judges whether a the horizontal module of the backup system of the host vehicle CH is normal.

In the self-driving starting condition confirming step 2300, the self-driving starting condition confirming module 1130 of the at least one processor 1100 confirms whether the self-driving starting condition is satisfied based on whether the condition of the driver of the host vehicle CH is usable at any one of the time points.

In the risk judging step 2400, the judging unit 1141 of the at least one processor 1100 judges whether the host vehicle CH encounters any one of the external risk, the system failure risk and the self-driving starting condition unsatisfied risk, wherein, in the status that the system is normal, if the longitudinal relative distance between the host vehicle CH and the front article CT at one of the time points is smaller than or equal to the external risk region $D_F$, that is $D_r \leq D_F$, encountering the external risk is confirmed; if the system fails while the horizontal module of the backup system is normal at one of the time points, encountering the system failure risk is confirmed; if the system is normal and the longitudinal relative distance $D_r$ is larger than the external risk region $D_F$ at one of the time points, that is $D_r > D_F$, but the self-driving starting condition is not satisfied, encountering the self-driving starting condition unsatisfied risk is confirmed.

In the horizontal vector calculating step 2500, a horizontal vector calculating unit 1142 of the at least one processor 1100 calculates a lane-changing time of the host vehicle CH changing to the target lane at the one of the time points as encountering any one of the external risk, the system failure risk and the self-driving starting condition unsatisfied risk so as to calculate an emergency horizontal acceleration of the host vehicle CH, and calculates a horizontal vector $v_y$ of the host vehicle CH based on the emergency horizontal acceleration or a regular horizontal acceleration.

In the drivable space calculating step 2600, the drivable space calculating unit 1143 of the at least one processor 1100 calculates the drivable space S1 on the target lane at the one of the time points based on the horizontal distance $D_y$, the horizontal vector $v_y$, and the rear article speed $v_r$ of the rear article CR on the target lane as encountering any one of the external risk, the system failure risk and the self-driving starting condition unsatisfied risk.

In the minimum risk decision executing step 2700, the decision executing unit 1144 of the at least one processor 1100 executes the minimum risk decision as encountering any one of the external risk, the system failure risk and the self-driving starting condition unsatisfied risk. As encountering the external risk or the system failure risk, the host vehicle CH drives into the drivable space S1 at the horizontal vector $v_y$, or decelerates to zero. As encountering the self-driving starting condition unsatisfied risk, the host vehicle CH drives into the drivable space S1 at the horizontal vector $v_y$, or the host vehicle CH moves along the original track according to the lane-changing decision at least for a period to another one of the time points; if the self-driving starting condition keeps being unsatisfied, the target lane at the another one of the time points, the horizontal vector $v_y$, for lane-changing and the drivable space S1 are reconfirmed.

Figure 4:
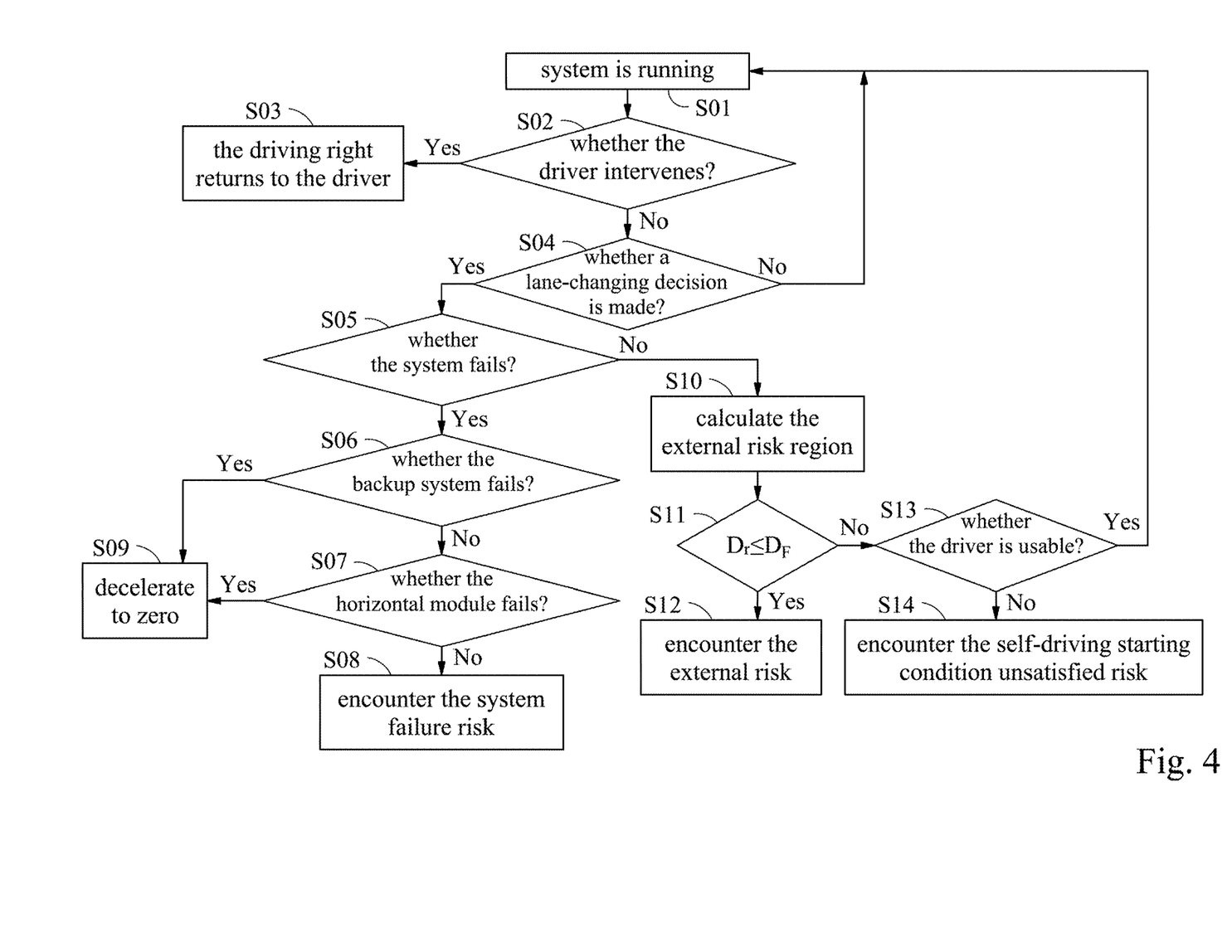
FIG. 4 shows a first detail flow chart of the minimum risk decision method of FIG. 3.

FIG. 4 shows a first detail flow chart of the minimum risk decision method 2000 of FIG. 3. In the beginning, in Step S01, the system (the main system of self-driving) is running and is normal, and whether the driver intervenes may be confirmed in Step S02, that is, confirming whether the driver intervenes to control the host vehicle CH by him/herself. If yes, Step S03 is executed, and the driving right returns to the driver. If not, Step S04 is executed, and whether a lane-changing decision is made is confirmed, that is, confirming whether the system decides to change lanes according to the situation of the roads. If not, Step S01 is returned, and the system keeps running; if not, Step S05 is executed to judge whether the system fails.

If the system failure judging module 1120 judges that the system fails, Step S06 is executed to further confirm whether the backup system fails. If yes, Step S09 is executed to decelerate the host vehicle CH to zero. If not, Step S07 is executed, and the system failure judging module 1120 confirms whether the horizontal module of the backup system fails. If the horizontal module fails, Step S09 is executed to decelerate the host vehicle CH to zero; if the horizontal module is normal, Step S08 is executed, and the judging unit 1141 judges that the host vehicle CH encounters the system failure risk.

If in Step S05 the system failure judging module 1120 judges that the system is normal and does not fail, Step S10 is executed, the external risk region calculating module 1110 calculates the external risk region $D_F$, and the way for calculating the external risk region $D_F$ is as mentioned above and not be repeated. After which, Step S11 is executed, and the judging unit 1141 confirms whether the longitudinal relative distance $D_r$ between the host vehicle CH and the front article CT is smaller than or equal to the external risk region $D_F$, that is, whether $D_r \leq D_F$ is satisfied. If yes, Step S12 is executed, and the judging unit 1141 judges that the host vehicle CH encounters the external risk. If not, Step S13 is executed, and the self-driving starting condition confirming module 1130 judges whether the driver is usable. If the driver is usable, Step S01 is returned, and the system keeps working; if the driver is not usable, Step S14 is executed, and the judging unit 1141 judges that the host vehicle CH encounters the self-driving starting condition unsatisfied risk.

Figure 5:
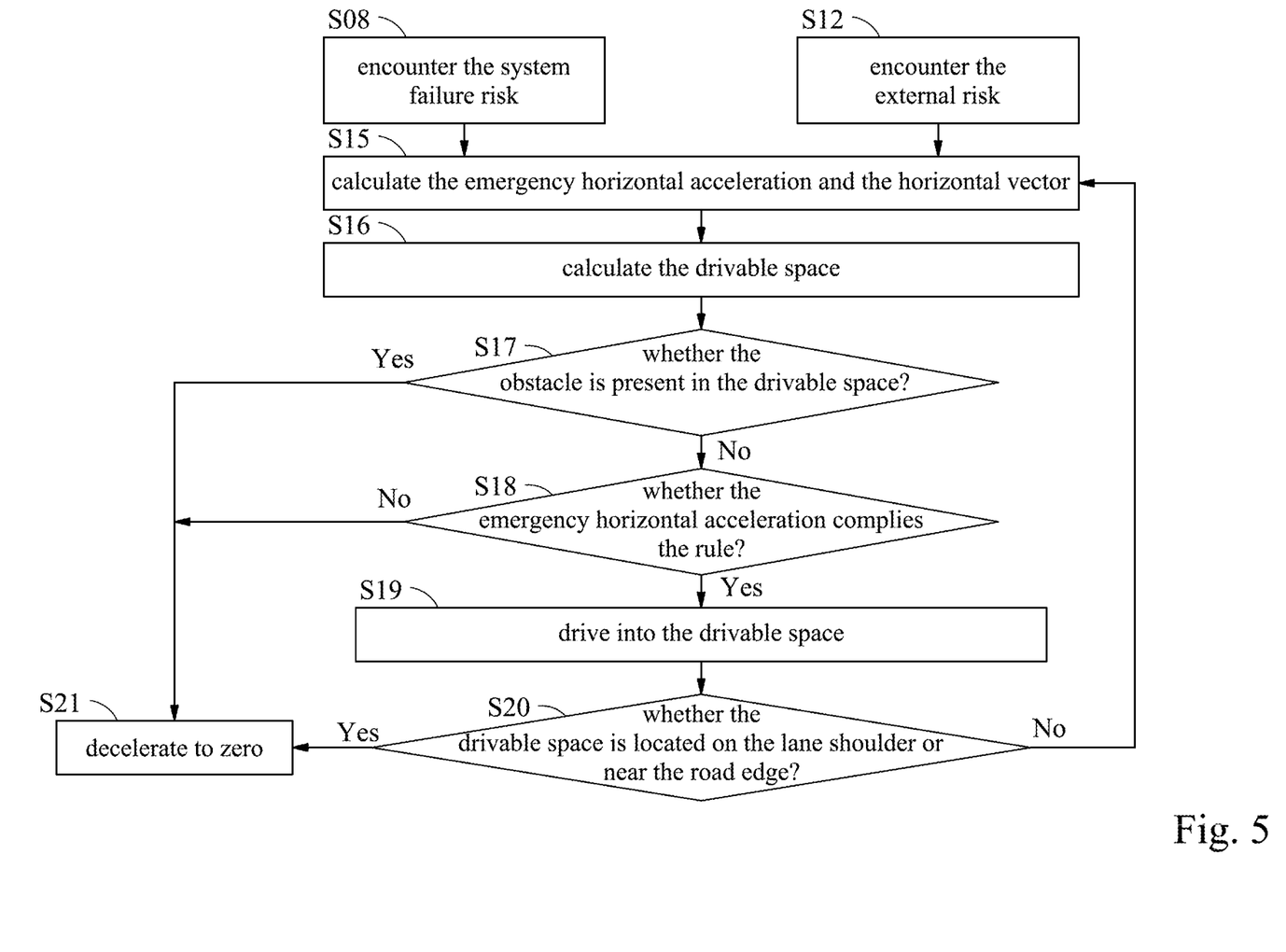
FIG. 5 shows a second detail flow chart of the minimum risk decision method of FIG. 3.

FIG. 5 shows a second detail flow chart of the minimum risk decision method 2000 of FIG. 3. Please refer to FIG. 5 with references of FIGS. 1 and 2, as Step S08 confirms the host vehicle CH encountering the system failure risk or Step S12 confirms the host vehicle CH encountering the external risk, Step S15 may be executed. The horizontal vector calculating unit 1142 calculates the emergency horizontal acceleration and the horizontal vector $v_y$, after which Step S16 is executed, and the drivable space calculating unit 1143 calculates the drivable space S1. For example, as the host vehicle CH is on the lane L1, the drivable space S1 on the lane L2 is calculated.

As encountering the system failure risk or the external risk, if no obstacle is present in the drivable space S1 and the emergency horizontal acceleration is smaller than or equal to the regulation emergency horizontal acceleration upper limitation, the host vehicle CH may drive into the drivable space S1. On the contrary, the host vehicle CH decelerates to zero. Hence, whether the obstacle is present in the drivable space S1 on the lane L2 may be confirmed in Step S17, and if yes, Step S21 is executed, the host vehicle CH decelerates to zero on the lane L1. If not, Step S18 is executed to further confirm that whether the obtained emergency horizontal acceleration satisfies the rule, that is, confirming whether the emergency horizontal acceleration is smaller than or equal to the regulation emergency horizontal acceleration upper limitation. If yes, Step S19 is executed, and the host vehicle CH drives into the drivable space S1 on the lane L2 based on the calculated steering angle and horizontal vector $v_y$. On the contrary, Step S21 is executed, and the host vehicle CH decelerates to zero on the lane L1. After the host vehicle CH enters the drivable space S1 on the lane L2, whether the drivable space S1 is located at the lane shoulder, i.e., the lane shoulder L3, or near the road edge may be confirmed in Step S20. If the lane L2 is not the lane shoulder L3 or the road edge, Steps S15 and S16 are returned to recalculate the horizontal vector $v_y$ and the next drivable space S1, e.g., the drivable space S1 on the lane shoulder L3. After which, Steps S17, S18, S19 and S20 are sequentially executed, the drivable space S1 is now located on the lane shoulder L3, and the host vehicle CH may decelerate to zero.

Figure 6:
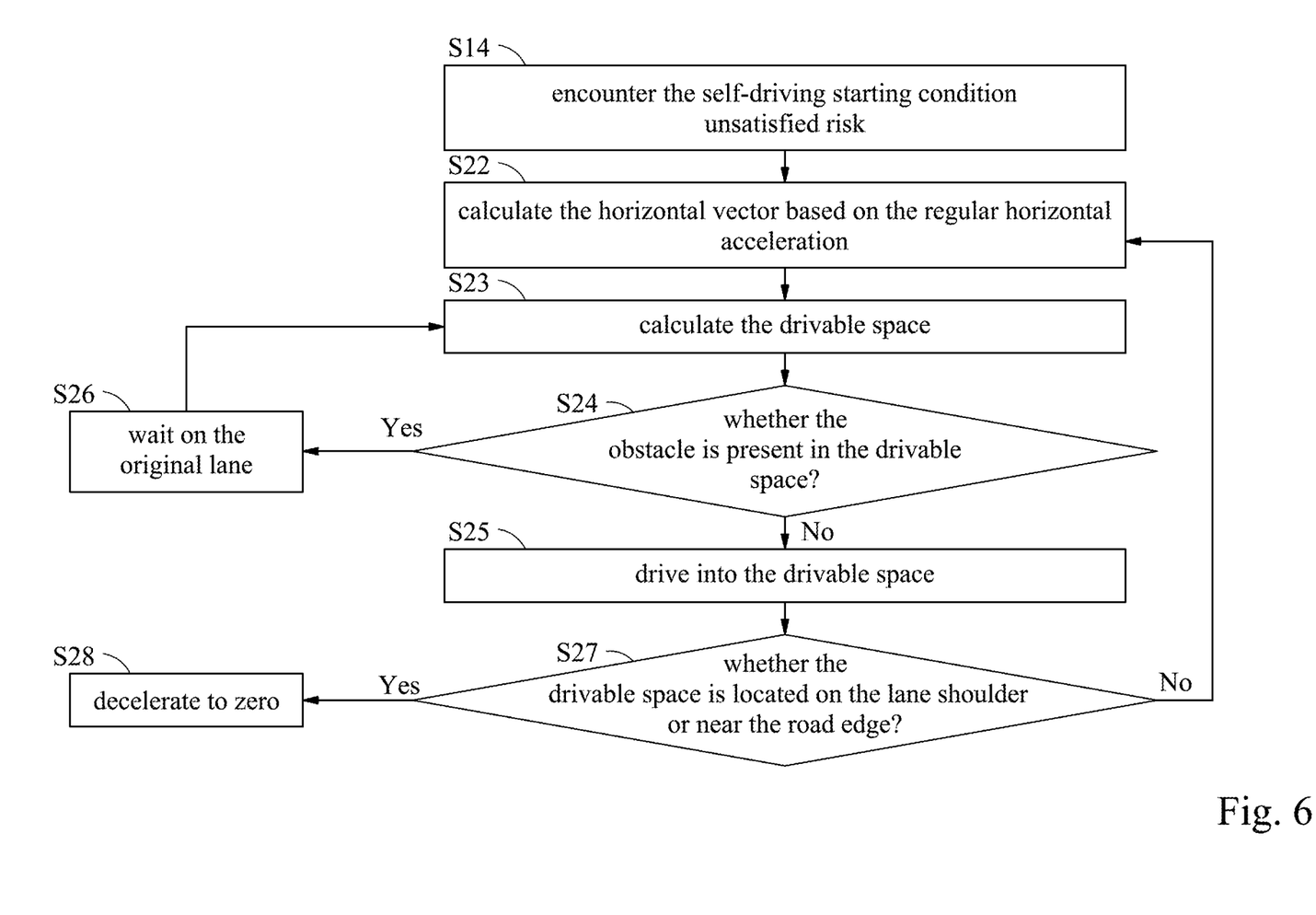
FIG. 6 shows a third detail flow chart of the minimum risk decision method of FIG. 3.

FIG. 6 shows a third detail flow chart of the minimum risk decision method 2000 of FIG. 3. Please refer to FIG. 6 with references of FIGS. 1 and 2, after confirming the host vehicle CH encounters the self-driving starting condition unsatisfied risk in Step S14, Step S22 may be executed, and the horizontal vector calculating unit 1142 calculates the horizontal vector $v_y$ based on the regular horizontal acceleration. After which, Step S23 is executed, and the drivable space calculating unit 1143 calculates the drivable space S1, e.g., the drivable space S1 on the lane L2. Subsequently, Step S24 is executed to confirm whether an obstacle is present in the drivable space S1. If yes, Step S26 is executed, and the host vehicle CH waits on the lane L1 and turns back to keep moving forward. Then, Steps S22 and S23 are executed again to update the drivable space S1 on the lane L2 based on the present position of the host vehicle CH and the relative information, and Step S24 is executed to confirm whether an obstacle is present in the drivable space S1 at the present time point. If not, Step S25 is executed, and the host vehicle CH drives into the drivable space S1 on the lane L2. Steps S27 and S28 are similar to Steps S20 and S21, and will not be repeated.

Figure 7:
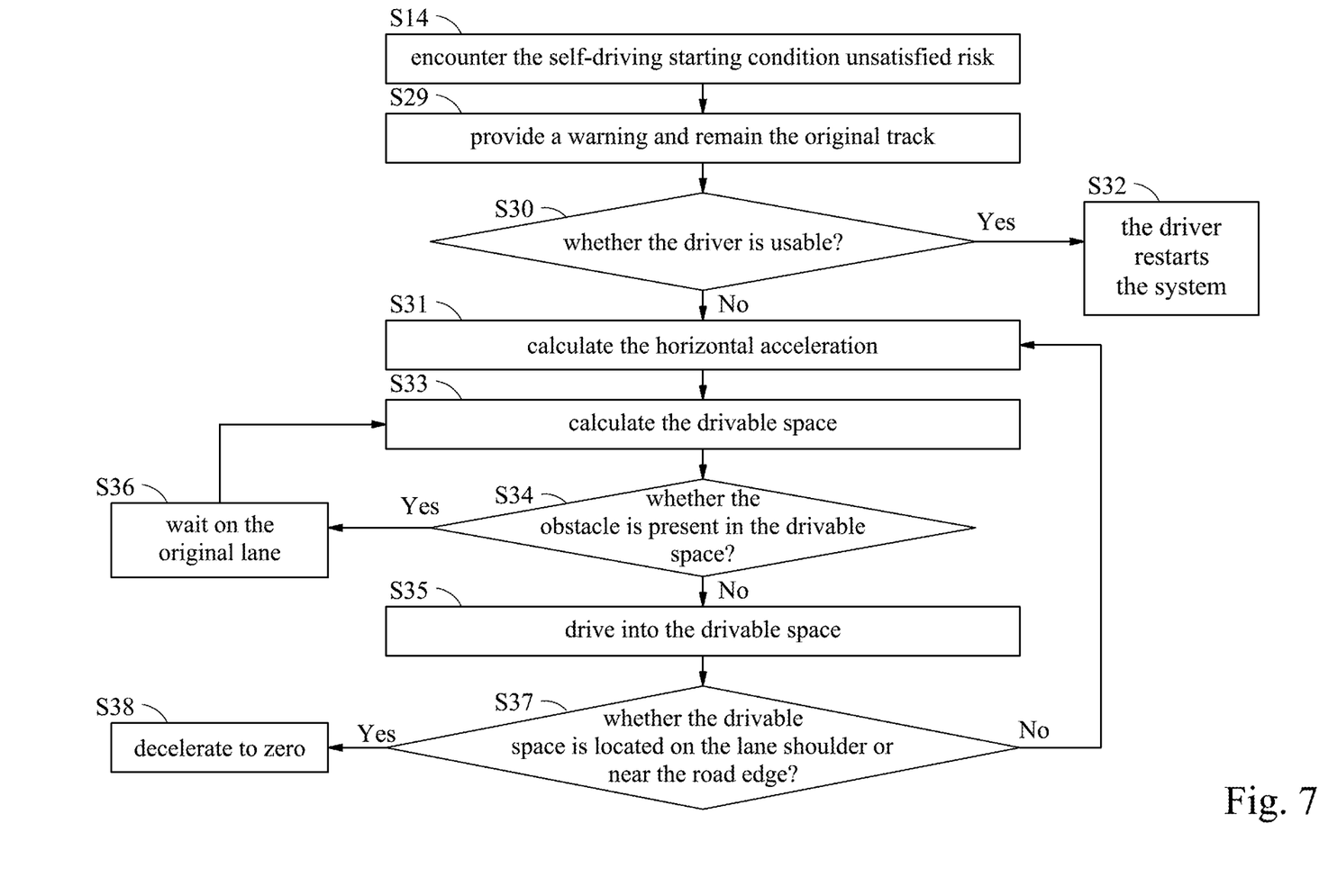
FIG. 7 shows a fourth detail flow chart of the minimum risk decision method of FIG. 3.

FIG. 7 shows a fourth detail flow chart of the minimum risk decision method 2000 of FIG. 3. Please refer to FIG. 6 with references of FIGS. 1 and 2, in another embodiment, after confirming the host vehicle CH encounters the self-driving starting condition unsatisfied risk in Step S14, Step S29 may be executed, and the host vehicle CH provides a warning and remains the original track, i.e., changing from the lane L1 to the lane L2 along the original track. After which, Step S30 is executed to confirm whether the driver is usable. If yes, the driver may be awake from a snap after warning, and Step S32 may be executed to restart the system by the driver. If not, Step S31 is executed, and the horizontal vector calculating unit 1142 calculates the horizontal vector $v_y$ based on the regular horizontal acceleration. After which, Step S33 is executed to calculate the drivable space on the lane shoulder L3. Steps S33, S34, S35, S36, S37 and S38 are similar to the Steps S23 to S28, and will not be repeated.

Yet another embodiment of the present disclosure is a non-transitory computer readable media, which stores a computer program for at least one processor to conduct calculating a collision time between a host vehicle in a present position and a front article at one of a plurality of time points after the host vehicle performs a lane-changing decision, calculating a horizontal acceleration of the host vehicle in the present position changing to a target lane based on the collision time, and calculating an external risk region based on a horizontal distance of the host vehicle changing to the target lane and a larger one of the horizontal acceleration and a maximum regular horizontal acceleration; judging whether a system of the host vehicle at any one of the time points fails and judges whether a horizontal module of a backup system of the host vehicle is normal; confirming whether a self-driving starting condition is satisfied based on whether a condition of a driver of the host vehicle is usable at any one of the time points; judging whether the host vehicle encounters any one of an external risk, a system failure risk and a self-driving starting condition unsatisfied risk, in a status that the system is normal, if a longitudinal relative distance between the host vehicle and the front article at one of the time points is smaller than or equal to the external risk region, encountering the external risk is confirmed; if the system fails while the horizontal module of the backup system is normal at one of the time points, encountering the system failure risk is confirmed; if the system is normal and the longitudinal relative distance is larger than the external risk region at one of the time points, but the self-driving starting condition is not satisfied, encountering the self-driving starting condition unsatisfied risk is confirmed; calculating a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and calculating a horizontal vector of the host vehicle based on the emergency horizontal acceleration or a regular horizontal acceleration; calculating a drivable space on the target lane at the one of the time points based on the horizontal distance, the horizontal vector and a rear article speed of a rear article on the target lane as encountering any one of the external risk, the system failure risk and the self-driving starting condition unsatisfied risk; executing a minimum risk decision as encountering any one of the external risk, the system failure risk and the self-driving starting condition unsatisfied risk, as encountering the external risk or the system failure risk, the host vehicle drives into the drivable space at the horizontal vector or decelerates to zero, and as encountering the self-driving starting condition unsatisfied risk, the host vehicle drives into the drivable space at the horizontal vector, or the host vehicle moves along an original track according to the lane-changing decision at least for a period to another one of the time points, if the self-driving starting condition keeps being unsatisfied, the target lane at the another one of the time points, the horizontal vector for lane-changing and the drivable space are reconfirmed.

The non-transitory computer readable media may be any data storage hardware, such as memory devices, which may store data and be read by a computer device. The non-transitory computer readable media may be a hard disk, a network attached storage (NAS), a read-only memory (ROM), a random-access memory (RAM), a CD-ROM, a CD-R, a CD-RW, a magnetic tape, and other optical or non-optical storage hardware. Hence, the program stored in the non-transitory computer readable media may be read and executed.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A minimum risk decision system for lane-changing, which is disposed at a host vehicle, the minimum risk decision system comprising:
    at least one processor, comprising:
        an external risk region calculating module configured to calculate a collision time between the host vehicle in a present position and a front article at one of a plurality of time points after the host vehicle performs a lane-changing decision, to calculate a horizontal acceleration of the host vehicle in the present position changing to a target lane based on the collision time, and to calculate an external risk region based on a horizontal distance of the host vehicle changing to the target lane and a larger one of the horizontal acceleration and a maximum regular horizontal acceleration;
        a system failure judging module configured to judge whether a system of the host vehicle at any one of the time points fails and to judge whether a horizontal module of a backup system of the host vehicle is normal;
        a self-driving starting condition confirming module configured to confirm whether a self-driving starting condition is satisfied based on whether a condition of a driver of the host vehicle is usable at any one of the time points; and
        a decision module, comprising:
            a judging unit configured to judge whether the host vehicle encounters any one of an external risk, a system failure risk and a self-driving starting condition unsatisfied risk, wherein, in a status that the system is normal, if a longitudinal relative distance between the host vehicle and the front article at one of the time points is smaller than or equal to the external risk region, encountering the external risk is confirmed; if the system fails while the horizontal module of the backup system is normal at one of the time points, encountering the system failure risk is confirmed; if the system is normal and the longitudinal relative distance is larger than the external risk region at one of the time points, but the self-driving starting condition is not satisfied, encountering the self-driving starting condition unsatisfied risk is confirmed;
            a horizontal vector calculating unit configured to calculate a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and to calculate a horizontal vector of the host vehicle based on the emergency horizontal acceleration or a regular horizontal acceleration;
            a drivable space calculating unit configured to calculate a drivable space on the target lane at the one of the time points based on the horizontal distance, the horizontal vector and a rear article speed of a rear article on the target lane as encountering any one of the external risk, the system failure risk and the self-driving starting condition unsatisfied risk; and
            a decision executing unit executing a minimum risk decision as encountering any one of the external risk, the system failure risk and the self-driving starting condition unsatisfied risk, wherein:
                as encountering the external risk or the system failure risk, the host vehicle drives into the drivable space at the horizontal vector or decelerates to zero; and
                as encountering the self-driving starting condition unsatisfied risk, the host vehicle drives into the drivable space at the horizontal vector, or the host vehicle moves along an original track according to the lane-changing decision at least for a period to another one of the time points, if the self-driving starting condition keeps being unsatisfied, the target lane at the another one of the time points, the horizontal vector for lane-changing and the drivable space are reconfirmed.

2. The minimum risk decision system of claim 1, wherein the external risk region calculating module is configured to calculate $T_c = D_r/(v_t - v_h)$, $a_y = 2D_y/(T_c^2)$, $a_{ymax} = \max(a_y, a_{yrgmax})$ and $D_F = (2D_y/a_{ymax})^{0.5} \times v_x$, $T_c$ represents the collision time, $D_r$ represents the longitudinal relative distance between the host vehicle and the front article, $v_h$ represents a host vehicle speed of the host vehicle, $v_t$ represents a front article speed of the front article, $a_y$ represents the horizontal acceleration calculated based on the collision time, $a_{yrgmax}$ represents the maximum regular horizontal acceleration, $a_{ymax}$ represents the larger one of the horizontal acceleration and the maximum regular horizontal acceleration, $D_y$ represents the horizontal distance, $v_x$ represents a longitudinal vector of the host vehicle speed, and $D_F$ represents the external risk region.

3. The minimum risk decision system of claim 2, wherein as encountering the external risk or the system failure risk at the one of the time points is confirmed by the judging unit, the horizontal vector calculating unit calculates $T_{Lc}=\max[(D_r-L)/(v_t-v_h), T_c/2, t_{ISO\ limit}]$ and $a_y^E=D_y/(T_{Lc}^2)$, $T_{Lc}$ represents the lane-changing time, L represents a length of the host vehicle, $t_{ISO\ limit}$ represents a regulation lane-changing prohibition time, and $a_y^E$ represents the emergency horizontal acceleration.

4. The minimum risk decision system of claim 3, wherein if no obstacle is present in the drivable space at the one of the time points, and the emergency horizontal acceleration is smaller than or equal to a regulation emergency horizontal acceleration upper limitation, the host vehicle drives into the drivable space; otherwise, the host vehicle decelerates to zero.

5. The minimum risk decision system of claim 4, wherein the host vehicle gradually drives to a right side until driving into the drivable space located at a lane shoulder and decelerates to zero.

6. The minimum risk decision system of claim 2, wherein as encountering the self-driving starting condition unsatisfied risk is confirmed by the judging unit at the one of the time points, the horizontal vector calculating unit uses the regular horizontal acceleration to calculate the horizontal vector.

7. The minimum risk decision system of claim 6, wherein if an obstacle is present in the drivable space, the host vehicle drives into the drivable space at the regular horizontal acceleration after the obstacle leaves the drivable space.

8. The minimum risk decision system of claim 7, wherein the host vehicle gradually drives to a right side until driving into the drivable space located at a lane shoulder and decelerates to zero.

9. The minimum risk decision system of claim 1, wherein as encountering the self-driving starting condition unsatisfied risk is confirmed by the judging unit at the one of the time points, the decision executing unit provides a warning in the period.

10. A minimum risk decision method for lane-changing, comprising:
- an external risk region calculating step, wherein an external risk region calculating module of at least one processor calculates a collision time between a host vehicle in a present position and a front article at one of a plurality of time points after the host vehicle performs a lane-changing decision, calculates a horizontal acceleration of the host vehicle in the present position changing to a target lane based on the collision time, and calculates an external risk region based on a horizontal distance of the host vehicle changing to the target lane and a larger one of the horizontal acceleration and a maximum regular horizontal acceleration;
- a system failure judging step, wherein a system failure judging module of the at least one processor judges whether a system of the host vehicle at any one of the time points fails and judges whether a horizontal module of a backup system of the host vehicle is normal;
- a self-driving starting condition confirming step, wherein a self-driving starting condition confirming module of the at least one processor confirms whether a self-driving starting condition is satisfied based on whether a condition of a driver of the host vehicle is usable at any one of the time points;
- a risk judging step, wherein a judging unit of the at least one processor judges whether the host vehicle encounters any one of an external risk, a system failure risk and a self-driving starting condition unsatisfied risk, wherein, in a status that the system is normal, if a longitudinal relative distance between the host vehicle and the front article at one of the time points is smaller than or equal to the external risk region, encountering the external risk is confirmed; if the system fails while the horizontal module of the backup system is normal at one of the time points, encountering the system failure risk is confirmed; if the system is normal and the longitudinal relative distance is larger than the external risk region at one of the time points, but the self-driving starting condition is not satisfied, encountering the self-driving starting condition unsatisfied risk is confirmed;
- a horizontal vector calculating step, wherein a horizontal vector calculating unit of the at least one processor calculates a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and calculates a horizontal vector of the host vehicle based on the emergency horizontal acceleration or a regular horizontal acceleration;
- a drivable space calculating step, wherein a drivable space calculating unit of the at least one processor calculates a drivable space on the target lane at the one of the time points based on the horizontal distance, the horizontal vector and a rear article speed of a rear article on the target lane as encountering any one of the external risk, the system failure risk and the self-driving starting condition unsatisfied risk; and
- a minimum risk decision executing step, wherein a decision executing unit of the at least one processor executes a minimum risk decision as encountering any one of the external risk, the system failure risk and the self-driving starting condition unsatisfied risk, wherein:
  - as encountering the external risk or the system failure risk, the host vehicle drives into the drivable space at the horizontal vector or decelerates to zero; and
  - as encountering the self-driving starting condition unsatisfied risk, the host vehicle drives into the drivable space at the horizontal vector, or the host vehicle moves along an original track according to the lane-changing decision at least for a period to another one of the time points, if the self-driving starting condition keeps being unsatisfied, the target lane at the another one of the time points, the horizontal vector for lane-changing and the drivable space are reconfirmed.

11. The minimum risk decision method of claim 10, wherein the external risk region calculating module calculates $T_c=D_r/(v_t-v_h)$, $a_y=2D_y/(T_c^2)$, $a_{ymax}=\max(a_y, a_{yrgmax})$ and $D_F=(2D_y/a_{ymax})^{0.5} \times v_x$, $T_c$ represents the collision time, $D_r$ represents the longitudinal relative distance between the host vehicle and the front article, $v_h$ represents a host vehicle speed of the host vehicle, $v_t$ represents a front article speed of the front article, $a_y$ represents the horizontal acceleration calculated based on the collision time, $a_{yrgmax}$ represents the maximum regular horizontal acceleration, $a_{ymax}$ represents the larger one of the horizontal acceleration and the maximum regular horizontal acceleration, $D_y$ represents the horizontal distance, $v_x$ represents a longitudinal vector of the host vehicle speed, and $D_F$ represents the external risk region.

12. The minimum risk decision method of claim 11, wherein as encountering the external risk or the system failure risk at the one of the time points is confirmed by the judging unit, the horizontal vector calculating unit calculates $T_{Lc}=\max[(D_r-L)/(v_t-v_h), T_c/2, t_{ISO\ limit}]$ and $a_y^E=D_y/(T_{Lc}^2)$, $T_{Lc}$ represents the lane-changing time, L represents a length of the host vehicle, $t_{ISO\ limit}$ represents a regulation lane-changing prohibition time, and $a_y^E$ represents the emergency horizontal acceleration.

13. The minimum risk decision method of claim 12, wherein if no obstacle is present in the drivable space at the one of the time points, and the emergency horizontal acceleration is smaller than or equal to a regulation emergency horizontal acceleration upper limitation, the host vehicle drives into the drivable space; otherwise, the host vehicle decelerates to zero.

14. The minimum risk decision method of claim 13, wherein the host vehicle gradually drives to a right side until driving into the drivable space located at a lane shoulder and decelerates to zero.

15. The minimum risk decision method of claim 11, wherein as encountering the self-driving starting condition unsatisfied risk is confirmed by the judging unit at the one of the time points, the horizontal vector calculating unit uses the regular horizontal acceleration to calculate the horizontal vector.

16. The minimum risk decision method of claim 15, wherein if an obstacle is present in the drivable space, the host vehicle drives into the drivable space at the regular horizontal acceleration after the obstacle leaves the drivable space.

17. The minimum risk decision method of claim 16, wherein the host vehicle gradually drives to a right side until driving into the drivable space located at a lane shoulder and decelerates to zero.

18. The minimum risk decision method of claim 10, wherein as encountering the self-driving starting condition unsatisfied risk is confirmed by the judging unit at the one of the time points, the decision executing unit provides a warning in the period.

19. A non-transitory computer readable media, which stores a computer program for at least one processor to conduct:

calculating a collision time between a host vehicle in a present position and a front article at one of a plurality of time points after the host vehicle performs a lane-changing decision, calculating a horizontal acceleration of the host vehicle in the present position changing to a target lane based on the collision time, and calculating an external risk region based on a horizontal distance of the host vehicle changing to the target lane and a larger one of the horizontal acceleration and a maximum regular horizontal acceleration;

judging whether a system of the host vehicle at any one of the time points fails and judges whether a horizontal module of a backup system of the host vehicle is normal;

confirming whether a self-driving starting condition is satisfied based on whether a condition of a driver of the host vehicle is usable at any one of the time points;

judging whether the host vehicle encounters any one of an external risk, a system failure risk and a self-driving starting condition unsatisfied risk, wherein, in a status that the system is normal, if a longitudinal relative distance between the host vehicle and the front article at one of the time points is smaller than or equal to the external risk region, encountering the external risk is confirmed; if the system fails while the horizontal module of the backup system is normal at one of the time points, encountering the system failure risk is confirmed; if the system is normal and the longitudinal relative distance is larger than the external risk region at one of the time points, but the self-driving starting condition is not satisfied, encountering the self-driving starting condition unsatisfied risk is confirmed;

calculating a lane-changing time of the host vehicle changing to the target lane at the one of the time points as encountering any one of the external risk, the system failure risk and the self-driving starting condition unsatisfied risk so as to calculate an emergency horizontal acceleration of the host vehicle, and calculating a horizontal vector of the host vehicle based on the emergency horizontal acceleration or a regular horizontal acceleration;

calculating a drivable space on the target lane at the one of the time points based on the horizontal distance, the horizontal vector and a rear article speed of a rear article on the target lane as encountering any one of the external risk, the system failure risk and the self-driving starting condition unsatisfied risk; and executing a minimum risk decision as encountering any one of the external risk, the system failure risk and the self-driving starting condition unsatisfied risk, wherein:

as encountering the external risk or the system failure risk, the host vehicle drives into the drivable space at the horizontal vector or decelerates to zero; and as encountering the self-driving starting condition unsatisfied risk, the host vehicle drives into the drivable space at the horizontal vector, or the host vehicle moves along an original track according to the lane-changing decision at least for a period to another one of the time points, if the self-driving starting condition keeps being unsatisfied, the target lane at the another one of the time points, the horizontal vector for lane-changing and the drivable space are reconfirmed.

* * * * *